United States Patent [19]
Hoffer et al.

[11] 3,740,530
[45] June 19, 1973

[54] APPARATUS AND METHOD FOR VERIFICATION OF A CREDIT CARD

[75] Inventors: Arthur Hoffer, Dix Hills; James Hall, East Northport, both of N.Y.

[73] Assignee: Transvac Electronics Inc., Plainview, N.Y.

[22] Filed: Dec. 7, 1970

[21] Appl. No.: 95,469

[52] U.S. Cl. .................. 235/61.7 B, 340/149 A
[51] Int. Cl. ............................................. G06k 7/00
[58] Field of Search .............. 235/61.7 B; 340/149; 194/4 R

[56] References Cited
UNITED STATES PATENTS

| | | | |
|---|---|---|---|
| 3,593,291 | 7/1971 | Carter | 235/61.7 B |
| 3,401,830 | 9/1968 | Mathews | 235/61.7 B |
| 3,221,304 | 11/1965 | Enikeieff | 235/61.7 B |

*Primary Examiner*—Maynard R. Wilbur
*Assistant Examiner*—Robert F. Gnuse
*Attorney*—Ostrolenk, Faber, Gerb & Soffen

[57] ABSTRACT

Apparatus and method for verifying a credit card: The card has three groups of machine readable information. The first and second groups of information are functionally related and a comparator compares them for validity. A second comparator sequentially compares them for validity. A second comparator sequentially compares the third group with information provided by the card holder. If both comparisons are favorable, recordation of purchase information is enabled. If either comparison is unfavorable, an alarm system is activated.

13 Claims, 6 Drawing Figures

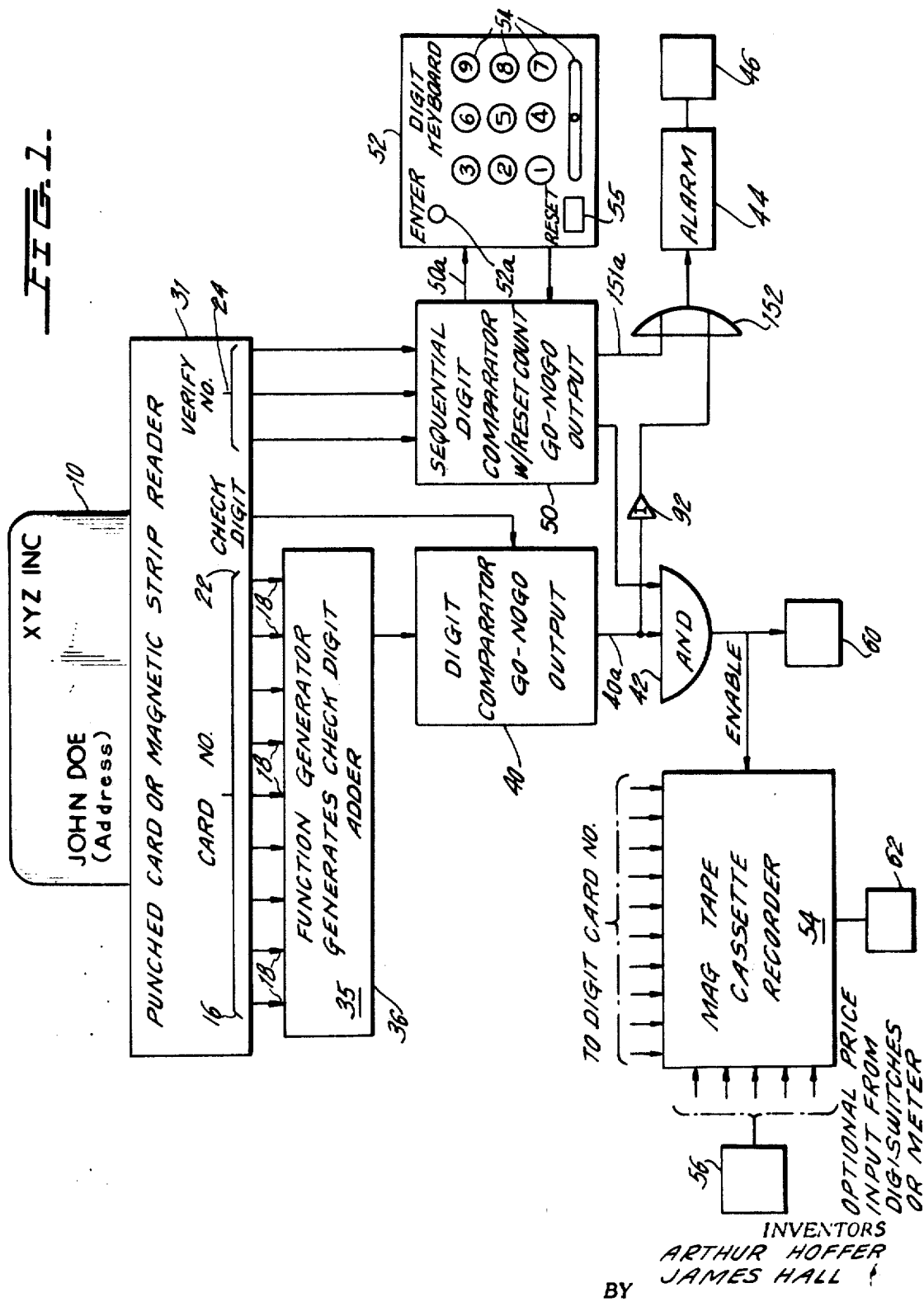

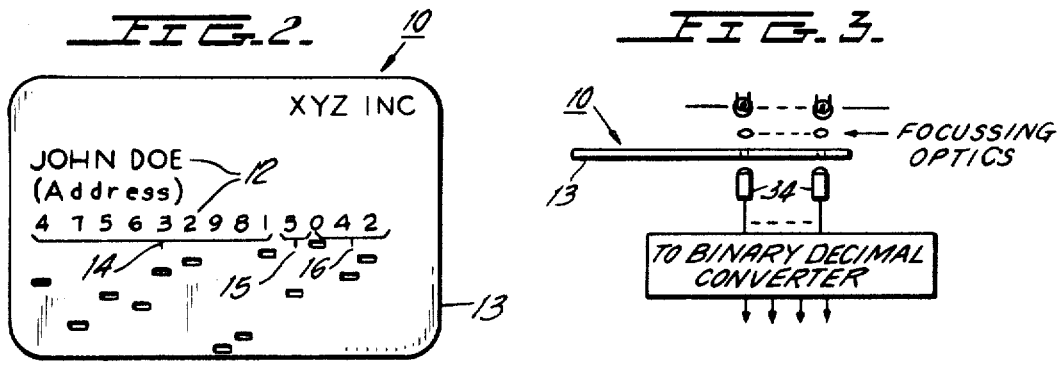
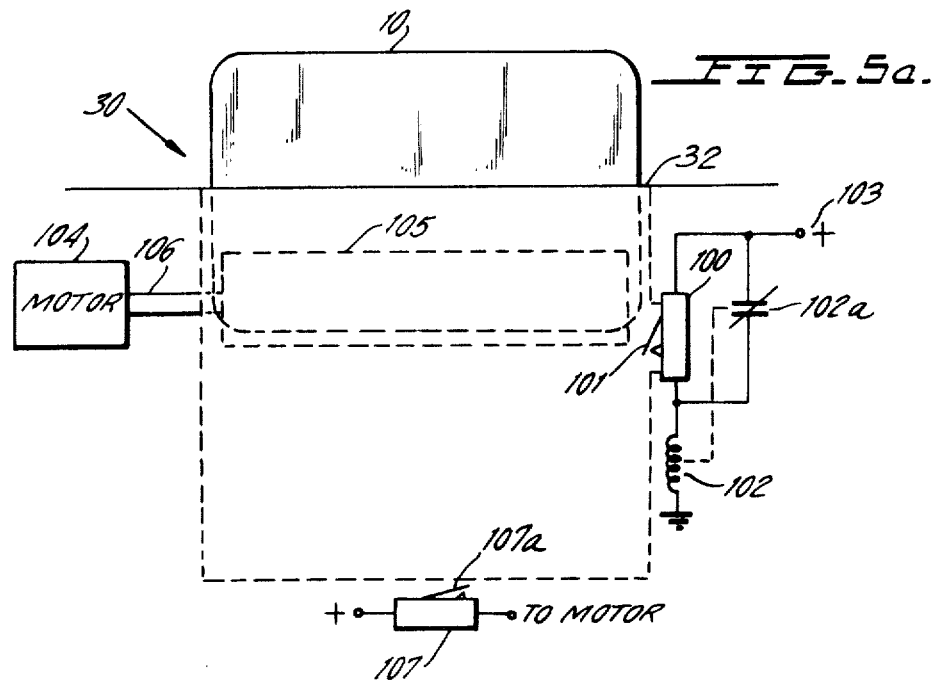
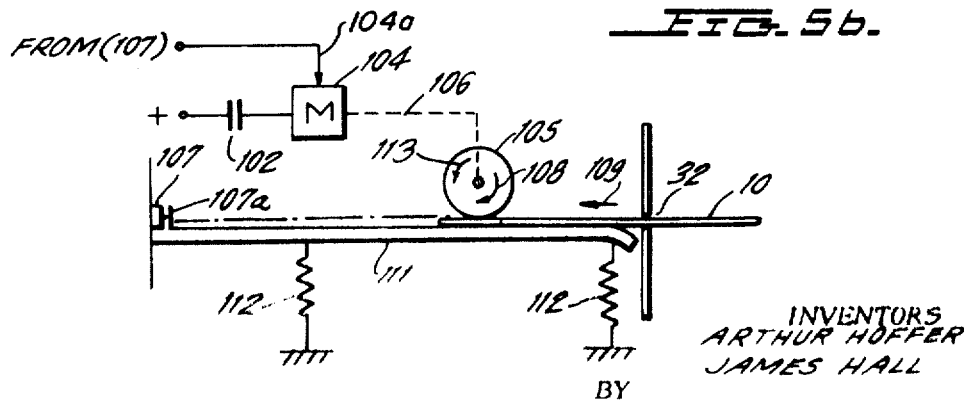

APPARATUS AND METHOD FOR VERIFICATION OF A CREDIT CARD

This invention relates to a self contained credit card verification apparatus and to a method of verifying a credit card.

Credit cards have recently become one of the most popular and frequently used techniques for purchases of goods and services. A major problem, however, resides in the use of credit cards by unauthorized persons. One method for controlling this problem is through the use of central information storage banks. From a remote station, e.g., a store where a credit card is presented, a message is transmitted to the central information storage bank, and after checking of records, a message verifies that the person presenting the card is authorized to use it, i.e., the card is not stolen, forged, outdated or otherwise defective. Such centralized systems are quite costly due to the need for personnel to operate the system, for the data storage bank and for communications network interfacing equipment coupling the individual "point of sale" locations and the central information bank.

Also, in order to record a purchase for charging the card owner's account, credit card and purchase information are recorded by a sales person on a multi-copy purchase information storage form, with one copy being given to the credit card user and another copy being first stored and then forwarded by the credit card accepting station to a processing central office. At the central office, the account of the store is credited with the amount of the purchase and the account of the credit card owner is charged correspondingly. This system requires that the transaction station maintain a large and expensive supply of non-reusable multi-copy purchase information storage forms. If completed forms are misplaced, the credit card accepting station does not receive credit for the purchase. Also, a large number of individual papers are moved around, increasing the possibility of human error. A written record of purchase information is usually prepared manually by sales personnel. The transfer of the purchase information to the central office also requires further manual operations. This entire procedure is time consuming and expensive. Even assuming that all transactions are recorded at the central data bank, the cost of equipment required to provide access to the central data collection system is prohibitive.

The present invention is characterized by providing a technique for local credit card verification thereby greatly reducing the amount of access to a central data bank which would otherwise be required.

In the present invention, each credit card is programmed with information employed to verify that the card holder is authorized to use the card. Card verification may thus be performed substantially simultaneously with the purchase transaction as well as establishing the criteria for approval and acceptance of a credit purchase. A multiplicity of such transactions may be temporarily stored at the point of purchase for subsequent transfer, thereby greatly simplifying both transmission and record keeping. Furthermore, automatic vending from a vending machine by credit card is now possible, since no human intermediary is required to verify the card or record the purchase.

In accordance with the invention, each credit card is programmed with three groups of machine readable information, which may be optically, mechanically, electrically or magnetically sensed. In one preferred embodiment, the information is punched into the card in a manner substantially similar to a Hollerith code.

The card is preferably inserted into a card slot provided in the verification device to a depth sufficient to activate a microswitch to activate a relay which causes the card to be drawn into the machine so that no portion of the card projects from the slot. The relay is latched into its energized state and is not released until the verification apparatus has recognized the presence of a valid card and an authorized card holder.

A first information group is selected to be functionally related to a second information group. The first and second information groups (which may incorporate overlapping information) are scanned and compared to ascertain that the groups are functionally related in a predetermined manner to ascertain that the card is valid and not forged. At least one of the two information groups (or a portion thereof) also identifies the credit card owner. A third information group which is preferably either unobservable or indecipherable, is functionally related to information known only by authorized card holders and which the person presenting the card would be required to provide when a purchase is made. The prerecorded information stored in the credit card is compared with that information provided by the card holder to determine whether the card holder is authorized to use it.

The information contained on (or in) the credit card is scanned by sensing means capable of sensing and recognizing the type of information recorded on the card. For example, if the credit card has been punched with coded information groups, a mechanical or optical punch card reader may be employed. If the information is recorded on (or in) the card in the form of magnetic patterns, a magnetic reading means may be employed. Information in the form of conductive strips or coatings provided on (or imbedded in) the card may be read by a capacity sensitive circuit.

A quantity representative of the first information group is generated by a function generator coupled to the card reader. This quantity is then transferred to a comparator. A quantity corresponding to the second information group read from the credit card is also transferred to the comparator. The comparator compares the first and second information groups to ascertain their functional relationship and generates an enabling signal, the presence or absence of which, respectively, enables or inhibits the completion of a transaction. The inhibit state of the comparator output indicates that the card was forged, had expired, had not been issued by the credit card issuing agency, or was otherwise defective. The inhibit state may be transmitted to an alarm generating and/or card rejecting unit.

Signals corresponding to the third information group sensed by the card reader are transferred to a sequential comparator. A conventional keyboard means or other suitable manually operable encoding device transmits signals to the sequential comparator representative of those keys which are depressed by the card holder or sales person. Only the authorized card holder knows the sequential code which is inserted into the keyboard in the required sequence. The sequential comparator compares both the characters and their sequences from the third information group on the card and from the keyboard to generate either one of two signal states which, respectively, enables or inhibits the transaction. The inhibit signal state from the sequential comparator may be employed to trigger an alarm and/or card rejecting unit, and to indicate that an unauthorized card holder has operated the keyboard.

Enabling signal states from both comparators are combined to enable a purchase to be completed and to cause information relating to the present transaction to be recorded. Automatically recorded purchase information is available for transmission to a central information retrieval and storage bank for subsequent crediting and debiting of the respective accounts of the selling station and the credit card owner. In addition, if the invention is associated with an automatic vending apparatus, the combined enable signal states may unlock the vending apparatus to permit an item to be vended.

Upon completion of the recording transaction during which the purchase information and credit card number, date, vendor, etc. are recorded, preferably upon magnetic tape provided in a cassette, the aforementioned relay is released to enable the credit card to be easily extracted from the verification apparatus. However, if either of the comparison operations generate an inhibit signal, the aforesaid relay remains latched, to prevent removal of the credit card. Access to the card under these circumstances is limited to a key-operated panel provided on the verification apparatus adjacent the card slot. Possession of the key is normally limited to security personnel.

The cassette may be removed at the end of each business day, or at any other interval and the data recorded therein may be transmitted at high speed through a terminal having a tape reader to a central processor.

The present invention is fully self-contained. There is no requirement for connection to any central information bank. All of the information required for validation is provided locally by the card and the card holder. The recording of purchase information on a suitable storage medium eliminates nearly all manual crediting and debiting recording procedures which are associated with conventional credit card systems.

Accordingly, it is the primary object of the present invention to provide a simplified credit card verification and purchase enabling apparatus and method.

It is another object of the present invention to provide a self-contained credit card verification and purchase recording apparatus and method.

It is another object of the present invention to provide such an apparatus and method which require a minimum of paper work, paper storage, paper transfers, storage space and which minimize errors.

It is a further object of the present invention to provide such an apparatus and method which include a system for determining that the person presenting and using the card is authorized to do so.

These and other objects of the present invention will become apparent from the following description of the accompanying drawings, in which:

FIG. 1 is a block diagram of a credit card verification and transaction recording system embodying the principles of the present invention;

FIG. 2 shows a credit card which may be verified by the apparatus of FIG. 1;

FIG. 3 is a block diagram showing a card reading circuit which may be employed in the apparatus of FIG. 1;

FIGS. 5a and 5b show the apparatus for moving the credit card into the card reader.

Figure 4:
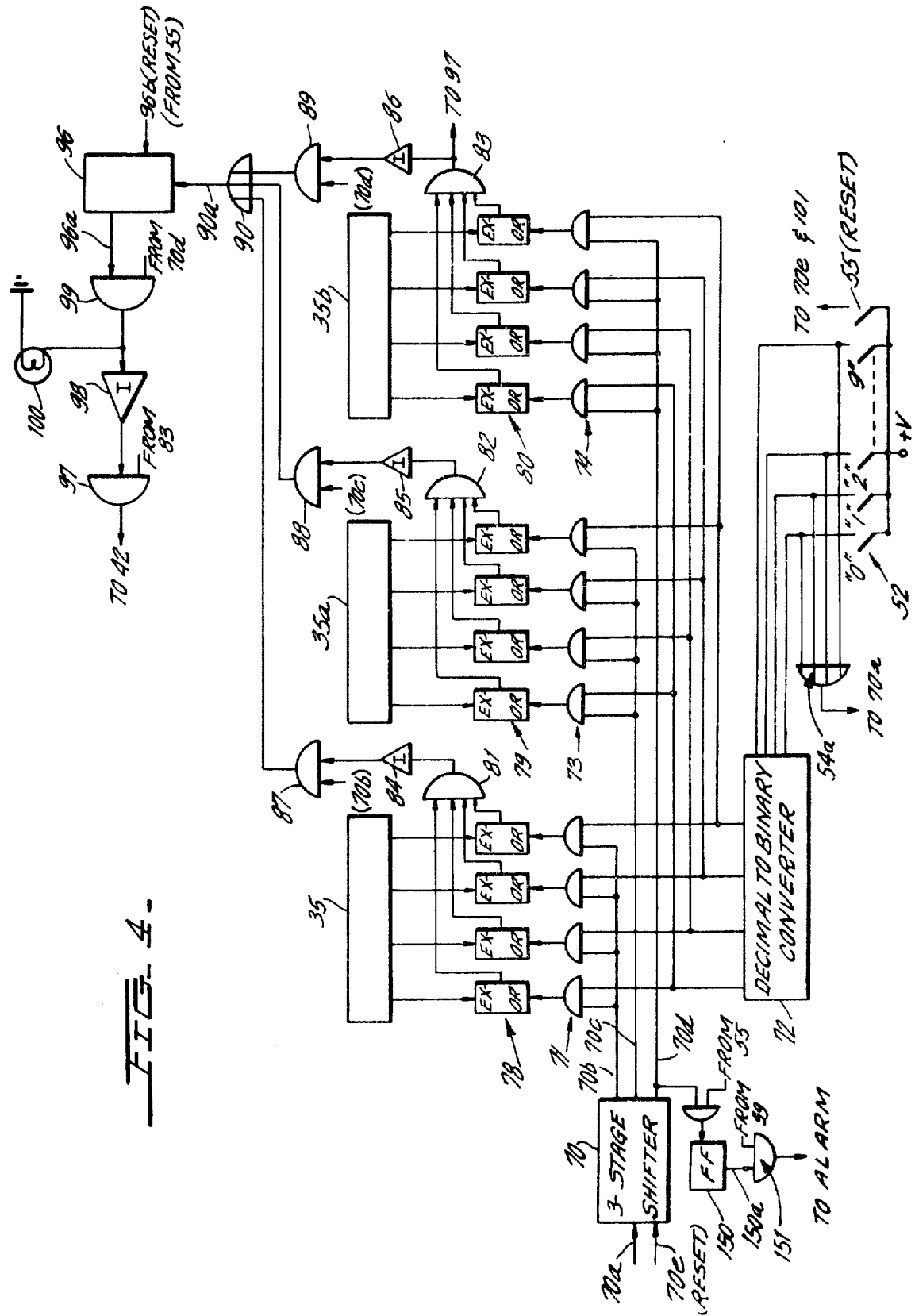
FIG. 4 is a logical diagram showing the sequential comparator of FIG. 1 in greater detail.

Turning to the drawings, FIG. 2 shows a conventional credit card 10, having visually observable indicia 12 on its face, e.g., the identity of the credit card holder and of the credit card issuing organization, which also contains machine readable information. The illustrated characters are further represented by holes 13 punched in the card which is provided with 13 columns and 10 rows, with each punched hole identifying a particular character or symbol in each column. On card 10, 13 identifying characters are illustrated. The first information group 14 comprises nine characters, which identify the owner of the credit card. The second information group 15, which need be only one character, is functionally related to one or more of the characters of the first information group 14. The particular functional relationship need not be known by either the operator or the card holder and is "hard wired" into the credit card verification apparatus. New cards having a different mathematical function arrangement may be issued from time to time, and the apparatus, described below, may, if desired, be simply and rapidly altered to accommodate this new relationship. If the second information group is not functionally related to the first information group in a predetermined manner, this is an indication that card 10 is outdated, forged or otherwise defective. Such functional changes may, for example, be made annually with the issuance of new credit cards.

The third information group 16, which may include three characters, represents a second verification number which the card holder would be required to know and to punch into keyboard 52, described below.

Credit card 10 is used in conjunction with credit card verification and purchase recording apparatus 30 shown in FIGS. 1, 3, 4, 5a and 5b. Card 10 is inserted in receiving slot 32 of apparatus 30. The card is inserted into slot 32 to a depth sufficient to actuate the arm 101 of microswitch 100 energizing relay coil 102 through power source 103. Relay 102 is latched into the energized state by closing its normally open contacts 102a.

Relay 102 is also provided with a second pair of normally open contacts 102b which are closed to energize motor 104. The output of motor 104 is mechanically coupled to a roller, as shown by dotted line 106, which is rotated in the direction shown by arrow 108 to move the card 10 into the slot in position for being read (the card being driven in the direction shown by arrow 109). Motor 104 is deenergized when the forward edge of card 10 bears against the arm 107a of normally closed microswitch 107 to thereby open the electrical circuit to motor 104 when the card reaches the fully inserted position.

Card 10 is supported by a platform 111 which is biased upwardly by springs 112 toward roller 105 to cause card 10 to make firm engagement with the surface of roller 105 to a degree sufficient to enable roller 105 to drive card 10 into the reading position when motor 104 is energized. The forward end of platform 111 is curved to facilitate insertion of card 10.

Motor 104 is provided with a second input 104a to receive a signal from AND gate 42 when the transaction is completed and recorded to drive motor 104 in the reverse direction, as shown by arrow 113 to permit ejection of a valid card.

The first nine digits are sensed either optically, mechanically, or electrically by a suitable punch card reader 31. FIG. 3 shows circuitry, which may be employed to read one group of punched holes provided in credit card 10, it being understood that similar reading means may be provided for each of the remaining stations. Alternatively, it should be understood that the card may be sequentially moved through the reading device in a stepwise manner wherein only a single reading station need be provided to sequentially read each group of punched information in the card. As shown in FIG. 3, a plurality of light sources 33 are aligned relative to the region in which the group of punches is provided. Ten such light sources are provided in order to sense the punched holes in one column. The light from each of the sources is either blocked or passed by the respective absence or presence of a hole, which condition is sensed by the (ten) photosensitive circuits 34. The outputs of the photosensitive devices 34 are passed to a decimal-to-binary converter for converting the sensed punched hole into a four bit binary code. Obviously, a code of a greater or lesser number of binary bits may be employed, depending only upon the needs of the user. Alternatively, the light sources and photosensitive devices may be replaced by conventional card reading devices which typically comprise sensing brushes which engage a cooperating conductive surface through a punched hole.

The binary coded outputs are transferred to selected inputs of function generator 35, which may, for example, be an adding circuit for summing the characters comprising the first information group to obtain a resultant sum. In the example of the credit card shown in FIG. 2, the mathematical sum would be 45. This sum is transmitted as a first input to conventional digit comparator 40.

The sensing mechanism also senses the second information group 15 and transmits a signal corresponding to the numeric value as a second input to digit comparator 40. A comparison is made by comparator 40 and either a go or a no-go (i.e., enable or inhibit) output signal is generated by digit comparator 40. The output signal is coupled to one input of AND gate 42. The inhibit signal state from comparator 40 is coupled with and causes operation of alarm 44 in a manner to be more fully described. A card eject operation is provided by coupling the output of gate 42 to the input 104a of motor 104 to eject the card from slot 32. Alternatively, transfer of the card into a tamperproof container (not shown) may be provided so that the card holder cannot retrieve the card and attempt to reuse the card elsewhere. As a further alternative, the card may remain in the slot until removed by appropriate security personnel.

The functional relationship between the first information group and the second information group may take a variety of forms. In one suitable form, the (single character) second information group may represent the least significant digit of the resultant sum of the nine numbers comprising the first information group. As another alternative, the sum of the numbers comprising the first information group, when summed together with the single character comprising the second information group, may, when added together, yield a resultant sum whose least significant digit is 0. As still another alternative, the nine characters comprising the first information group may each be multiplied by a different weighting factor and these nine products may then be summed to form a resultant sum whose least significant digit may be equal to the second information group or may add to 0 when summed with the character of the second information group. Further, the relationship may be a logic-type function. Obviously, a number of other alternatives are possible. In this connection, the comparator circuit may be comprised of summing means for summing the two information input groups and means for detecting the presence of a decimal 0 in the least significant digit position, or for means to detect their equality in magnitude. Since a wide variety of conventional circuits may be employed for achieving these results, a detailed description of such circuitry has been omitted herein for purposes of brevity. In any case, the digital comparator may provide, at its output terminal 40a, a binary ONE level signal indicating the presence of a favorable comparison or alternatively may provide a binary ZERO signal indicating the lack of comparison between the information contained in the first and second information groups.

The third information group 16 on card 10, or information functionally related thereto, is known to the card holder. Preferably, the information group 16 is either invisible or, at least, is undecipherable by anyone observing the card. For example, the sequence of the digits may be jumbled on the card and the digits may also be part of the other indicia on the card. Accordingly, an unauthorized card holder would not know and could not ascertain the identify (and/or the sequence) of the three digits comprising information group 16 simply by looking at the card. The last three digits on the card are sensed by conventional sensing means of the type described hereinabove. This information is decoded in the manner described and is transferred to a sequential digital comparator 50 which stores the numbers comprising group 16 in a predetermined sequence which preferably differs from the sequence in which the digits appear on the card. The last three digits have been shown in FIG. 2 in an "unscrambled" fashion to facilitate the description of the invention.

Keyboard 52 having keys 54 thereon is manually operated by the person presenting the credit card. The card holder depresses the keys in a predetermined sequence. Signals corresponding to the value and order of the encoded digits are transferred to comparator 50. Comparator 50 compares digits of information group 16 with the encoded digits from keyboard 52 to generate either go or no-go (i.e., enable or inhibit) signal. The output signal from comparator 50 is coupled to the remaining input of AND gate 42. The output signal from comparator 50 is also transmitted to alarm 44 and possibly to an optional mechanism 46 for transferring the card to a tamper-proof container in a manner to be more fully described.

The third information group 16 may take a variety of forms. One suitable arrangement is to provide the characters comprising group 16 in a "scrambled" form upon the card, so that even though the three characters are visually observable, their preferred order is not apparent from the observation of the card except by an authorized card holder. The "hard wired" circuitry of the sequential comparator 50 is thus designed to "unscramble" the scrambled arrangement provided on the card. As another obvious alternative, the characters comprising the third information group 16 may be embedded within the card in the form of a coded pattern or, while being provided upon the surface of the card, may be encoded in the form of a magnetic pattern, which cannot be read by the human eye but can only be read by a magnetic sensing means. As another alternative, the characters comprising the third information group 16 may be in the form of small conductive coatings embedded within the card, which are read by suitable sensing means. For example, the sensing means may be capacitive-type sensing means which sense the capacity of each of the bit positions of a code to generate a binary coded information signal group in a manner substantially similar to the optical sensing means shown in FIG. 3. This information may then be converted by a suitable conversion circuit similar to the circuit 35 shown in FIG. 3 to generate a binary coded representation. In one preferred embodiment, the card holder enters the three numbers in sequence by depressing the appropriate keyboard decimal keys which transfers a binary coded representation of the numbers (in sequence) to comparator 50. Upon comparison of each number with the appropriate numbers of the sequence derived from the information group 16 from credit card 10, an enabling signal may be transferred through output lead 50a back to keyboard 52.

FIG. 4 shows one possible logical circuitry which may be employed for performing the sequential comparison. Considering FIG. 4 in conjunction with FIG. 1, after inserting the credit card into the appropriate slot, the card holder depresses reset button 55 provided on digit keyboard 52. This signal is applied to the reset input terminal 70e of a three-stage shift register 70 to reset the register to "0". The first decimal key representing the cardholder's number is then depressed, coupling the output of the depressed key through OR gate 54a to control input 70a of counter 70, causing its first output terminal 70b to go to binary "1" state. Output 70b is coupled to a group of AND gates 71 to enable these gates to pass binary coded information therethrough in a manner to be more fully described. The card holder or operator, having depressed one of the digit keys 54 representative of the first number in the sequence to be entered, this information is decoded by a decimal-to-binary decoding circuit 72 to provide binary out-put signals at its four output terminals representative of the digit key depressed. This information is simultaneously impressed upon the AND gate groups 71, 73 and 74. However, since only AND gate group 71 is enabled, the binary coded information from the keyboard will be passed only by AND gate group 71. The sensing devices 75, 76 and 77 all couple the information read from their card to their associated exclusive-OR gate groups 78, 79 and 80, respectively. The binary coded signal group from the keyboard is compared with the binary coded signal group from the decimal to binary converter 35 in exclusive-OR gate group 78. The exclusive-OR gates are each adapted to generate a binary "1" level output signal when the respective input signals applied to their input terminals favorably compare. When all the exclusive-OR logical gates provide favorable comparisons, their outputs will all be at binary "1" level, thereby enabling an AND gate 81 to generate a binary "1" level output which is coupled to the input of an inverter circuit 84 whose output, in turn, is coupled to one input of AND gate 87. The remaining input teminal of AND gate 87 is coupled to output 70b of three stage shift register 70. In the case of a favorable comparison, inverter circuit 84 inverts the binary "1" level output to a binary "0" level output, disabling AND gate 87. If the comparison is unfavorable, gate 87 is enabled, whereby its output is passed by OR gate 90 to set the output 96a of flip-flop 96, high.

The card holder inserts the second digit in the sequence, which is transferred only by AND gate group 73 to exclusive-OR gate group 79 as a result of the fact that output 70c of three stage shift register 70 is in the binary "1" state due to the signal received from OR gate 54a. A comparison occurs at this stage and either a binary "1" level signal is generated by AND gate 82 to indicate favorable comparison, or alternatively, AND gate 82 provides a binary "0" level output. In the case where an unfavorable comparison has occurred, the output of AND gate 82 is at binary "0" level. This level is inverted by inverter circuit 85 which is passed by AND gate 88 only when the output 70c of three stage shift register 70 is high. This output is coupled through OR gate 90 to the bistable flip-flop circuit 96 in order to store the presence of an unfavorable comparison. If the output 96a of bistable flip-flop 96 has already been set high, it will remain high. A similar operation occurs in connection with the AND gates 87, 88 and 89 in the case where an unfavorable comparison occurs at any step of the sequential comparison.

Output 70d of counter 70 goes high, thereby enabling only AND gate group 74 to cause a comparison of the last entered digit to be made with the final digit stored in card 10, as a result of the output of OR gate 54a. If the comparison is favorable, AND gate 83 is enabled to apply an output signal to AND gate 97. This output is ANDed with output 70d from counter 70 and the inverted output of flip-flops 96 (through inverter 98). If flip-flop 96 has not been "set" by any of the gates an enabling signal is obtained from gate 97. If flip-flop 96 has been set by at least one of the gates 87, 88 or 89, gate 97 will be disabled. However, gate 99 will be enabled, causing an alarm signal to be generated. If the third and final digit fails comparison, the output of AND gate 83 will be at the binary "0" level. This level is inverted by inverter circuit 86 and is passed by AND gate 89 only during a time in which the output 70d of three stage shift register 70 is high so as to be passed by OR gate 90 to the flip-flop circuit 96.

If AND gate 42 receives an enabling signal from both of comparators 40 and 50, an enabling (i.e., binary "1") signal is transferred to magnetic tape cassette recorder 54. When recorder 54 is energized, the sensing mechanism, still sensing digits 18 and 22 on card 10, transmits signals representing the card owner identification signal to the recorder. The price of goods or services being sold and any other purchase information, e.g., identification of the goods or services, the place of purchase, the time of purchase, the sales person, etc., is also encoded through a second keyboard 56 or other suitable encoding means or input means and then transmitted to recorder 54.

Recorder 54 may also include a print-out mechanism 62, which prepares a receipt for the purchaser.

The enabling signal from AND gate 42 may also be transmitted to automatic vending apparatus 60 which is then unlocked to automatically vend an item. Because of the automatic vending feature, the present invention is adapted for credit card vending of goods, without any human intervention being required at any stage in the purchase procedure.

At predetermined periods, the tape cassette in recorder 54 may be replaced. The recorded tape is conventionally automatically read. The recorded information permits debiting and crediting, respectively, of the card owner's and the vending institution's accounts.

In the case where any one of the digits entered by the card holder are incorrect (i.e., do not yield a favorable comparison), the output 96a of flip-flop 96 is AND'ed with output 70d of counter 70 in AND gate 99 to actuate an error lamp 100. The card holder is given one more opportunity to correct the error by depressing reset button 55 and reinserting the digits in sequence. The output of reset button 55 also resets flip-flop 96 through reset input 96b. The reset button output is combined with output 70d of counter 70 in gate 101 to advance a bistable circuit 150 so that its output 150a goes high. The comparison operation is repeated in the same manner as set forth herein. If the card holder's second attempt is incorrect, the output of gate 99 will be high. This state is AND'ed with the output 150a from two-stage counter 150 to generate an alarm signal.

The output of digital comparator 40, in addition to being coupled to one input of AND gate 42, is coupled through an inverter circuit 92 and an OR gate 152 to the input of the alarm circuit 44. The output 151a (note both FIGS. 1 and 4) of gate 151 is coupled through OR gate 152 to alarm circuit 44, enabling either of the two comparison operations to trigger alarm circuit 44 in the case where comparison is not obtained.

It can be seen from the foregoing description that the present invention provides a novel credit card apparatus wherein both card verification and transaction recordation are performed at the point of sale, thereby eliminating the need for any communication with a central data collection point. By recording a plurality of transactions in a magnetic tape storage means, the transfer of such information to a central data collection point may be minimized. For example, such transactions involving the transfer of information to the central data collection point may be done at the end of each business day, or in accordance with any other convenient schedule.

Although this invention has been described with respect to preferred embodiments, it should be understood that many variations and modifications will now be obvious to those skilled in the art and, therefore, the scope of this invention is to be limited not by the specific disclosure herein, but only by the appended claims.

I claim:

1. Apparatus for verification of a credit card containing data in the form of indicia on the surface thereof comprising:
   first sensing means for sensing a first portion of said indicia recorded on the credit card;
   said first sensing means including means for combining the first portion of indicia derived from said card in a predetermined manner to generate a first resultant output;
   second sensing means for sensing a second portion of said indicia, which second information group is functionally related to said first portion in a predetermined manner;
   said second sensing means including means for generating a second output representative of said sensed indicia;
   a first comparator coupled to said first and second sensing means for comparing said first resultant output with said second output to determine whether the first and second portions of said indicia are functionally related in said predetermined manner;
   said comparator including further means for generating an enabling signal when the comparison operation shows the presence of said first predetermined functional relationship, and for generating an alarm signal when the comparison shows said first predetermined functional relationship is absent;
   means for storing data relating to the credit transaction;
   said storing means including means coupled to said first comparator for enabling said storing means to be operated only when said first predetermined relationship is present;
   third sensing means for sensing a third information group recorded on said card;
   second comparator means;
   manually operable encoding means for entering information into said second comparator in a predetermined sequence;
   said second comparator means including means for sequentially comparing the information derived from said encoding means with succeeding group of characters sensed from the card with the encoded portions of said third information group to detect comparison therebetween;
   said second comparator means including means for generating an enabling signal when all of said sequential comparisons are valid;
   said third character sensing means also senses the sequence of the characters in the third group and transmits information as to the sequence to said second character comparator;
   said encoding means being adapted to be encoded with a group of characters in a sequence and to transmit the sequence to said second character comparator;
   said second character comparator including means for holding information from said third characters on said card, means for receiving information as to the sequence in which characters are encoded on said encoding means, means for comparing the sequences of the sensed and encoded third characters, means for transmitting the go signal when the compared sequences bear a second predetermined relationship and means for transmitting the no-go signal when the compared sequences do not bear said second predetermined relationship.

2. In combination, the apparatus for verification of a credit card of claim 1, and a credit card means adaptable for automatic verification, said credit card means comprising:
   a card element;
   first and second groups of data recorded on said card element in a predetermined arrangement and being adapted to be sensed by and said first and second sensing means, respectively.

3. The apparatus for verification of a credit card of claim 1, wherein said storing means is coupled to at least one of said first and second sensing means in order to record at least one of said groups of characters;

transaction information entry transmitting means for inserting information relating to said transaction into said storing means.

4. The apparatus of claim 1, wherein,
said encoding means includes a keyboard with manually operable keys each representing a different character and/or symbol.

5. The apparatus of claim 1, wherein
said first and said second enabling devices comprise a common enabling gate means coupled to said first and second comparator means for generating an enabling signal when both said first and second comparator means generate enabling signals.

6. The apparatus of claim 5, further including:
recording means responsive to the enabling of said enabling gate means and being coupled to said sensing means for recording at least one of said sensed information groups.

7. The apparatus of claim 1, further comprising alarm means responsive to said second comparator for providing an alarm condition when said second comparator fails to generate an enable signal.

8. Apparatus for verification of an indicia bearing credit card, comprising:
sensing means for sensing indicia on said card and for generating signals representing said indicia;
manually operable encoding means, including entering means for generating signals representative of the operation of said entering means;
a comparator responsive to said sensing means and said encoding means for generating an enabling signal only when the encoded information presented to said comparator is related to the indicia sensed from said card in a predetermined manner;
normally disabled transaction recording means responsive to said enabling signal for enabling the recording of a transaction;
said sensing means further comprising means for transferring portions of said card indicia to said comparator in a predetermined order;
said encoding means including means adapted to be operated to enter information sequentially;
said comparator including means for comparing the information sequentially presented thereto.

9. The apparatus of claim 8 wherein,
said entering means includes a keyboard with manually operable keys representing certain predetermined characters and/or symbols.

10. Apparatus for verification of an indicia bearing credit card to facilitate the purchase transaction at an unattended location, comprising:
sensing means for sensing indicia on said card and for generating signals representing said indicia;
manually operable encoding means, including entering means for generating signals representative of the operation of said entering means;
a comparator responsive to said sensing means and said encoding means for generating an enabling signal only when the encoded information presented to said comparator is related to the indicia sensed from said card in a predetermined manner;
normally disabled transaction recording means responsive to said enabling signal for enabling the recording of a transaction;
said sensing means further comprising means for transferring portions of said card indicia to said comparator in a predetermined order;
said encoding means including means adapted to be operated to enter information sequentially;
said comparator including means for comparing the information sequentially presented thereto with the indicia derived from said sensing means in said predetermined order for generating a release signal when said indicia and said information favorably compare;
normally disabled vending means coupled to said comparator; said vending means being enabled to dispense the goods being vended when said release signal is present.

11. Apparatus for determining whether the holder of a card is its rightful possessor wherein said card contains indicia representing information related to the card holder;
first sensing means for sensing at least selected portions of said indicia;
comparator means;
manually operable input means for entering information units derived from said card holder into said comparator means in a predetermined sequence;
means coupled between said first sensing means and said comparator means for transferring the sensed selected portions of indicia in a predetermined arrangement into said comparator means;
said comparator means including means for comparing the arrangements presented thereto for generating a valid signal only when the arrangement of information received from said card compares with the arrangement of the information group entered into said input means;
said indicia on said card representing a plurality of characters arranged in an orderly fashion;
said first sensing means comprising means for sensing selected ones of said characters which are separated from one another by characters on said card which are not being sensed by said first sensing means.

12. Apparatus for determining whether the holder of a card is its rightful possessor wherein said card contains indicia representing information related to the card holder;
first sensing means for sensing at least selected portions of said indicia;
comparator means;
manually operable input means for entering information units derived from said card holder into said comparator means in a predetermined sequence;
means coupled between said first sensing means and said comparator means for transferring the sensed selected portions of indicia in a predetermined arrangement into said comparator means;
said comparator means including means for comparing the arrangements presented thereto for generating a valid signal only when the arrangement of information received from said card compares with the arrangement of the information group entered into said input means; said indicia sensed from said card representing groups of coded information each representing a character;
said input means includes keyboard means having a plurality of keys adapted to permit sequential operation of only one key at a time;

means coupled to said keyboard for generating a coded representation of the depressed key;

said transferring means including means coupled to said keyboard means for sequentially enabling only one group of said coded information to be transferred to said comparator means as a key is depressed;

at least two characters being inputted through said keyboard means for comparison with two characters sensed from said card;

alarm means coupled to said comparator means for providing a failure of comparison indication only after the last comparison operation has been performed;

further means coupled to said alarm means for resetting said enabling means a predetermined number of times to permit additional comparison operations to be performed after the initial comparison operation provides a failure of comparison indication.

13. The apparatus of claim 12 wherein said resetting means is further comprised of counting means for counting the number of failure of comparison operations and second alarm means for providing an indication that said predetermined number has been accumulated.

* * * * *